United States Patent [19]

Nash et al.

[11] 4,073,441
[45] Feb. 14, 1978

[54] GAS TURBINE ENGINE NOZZLE APPARATUS INCLUDING A NOZZLE FLAP SLOT SEAL

[75] Inventors: Dudley O. Nash, Forest Park; Thomas S. Clayton, Cincinnati, both of Ohio

[73] Assignee: General Electric Company, Cincinnati, Ohio

[21] Appl. No.: 729,594

[22] Filed: Oct. 4, 1976

[51] Int. Cl.² ............................................. B64C 15/06
[52] U.S. Cl. ............................................. 239/265.41
[58] Field of Search ...................... 239/265.19, 265.33, 239/265.37, 265.39, 265.41

[56] References Cited

U.S. PATENT DOCUMENTS

| | | | |
|---|---|---|---|
| 3,237,864 | 3/1966 | Taylor et al. | 239/265.41 X |
| 3,387,788 | 6/1968 | Brown | 239/265.37 |
| 3,599,875 | 8/1971 | Wynosky | 239/265.41 |
| 3,722,797 | 3/1973 | Hammill | 239/265.19 |

*Primary Examiner*—John J. Love
*Attorney, Agent, or Firm*—Robert C. Lampe, Jr.; Derek P. Lawrence

[57] ABSTRACT

Apparatus for modulating the area of a gas turbine engine nozzle which provides for positive sealing between overlapping articulated flaps when the overlapped flap is axially slotted to receive a portion of the overlapping flap. An arcuate seal is attached to the overlapping flap by means of a floating connection, the overlapping flap dragging the seal therewith in the axial direction. A seat is mounted on either side of the slot to slidingly receive a pair of shoulders laterally extending from the seal. A portion of the seal is received within the slot and is so contoured as to partially define the nozzle flow path. A sleeve captures and supports the seal shoulders during their axial travel.

10 Claims, 5 Drawing Figures

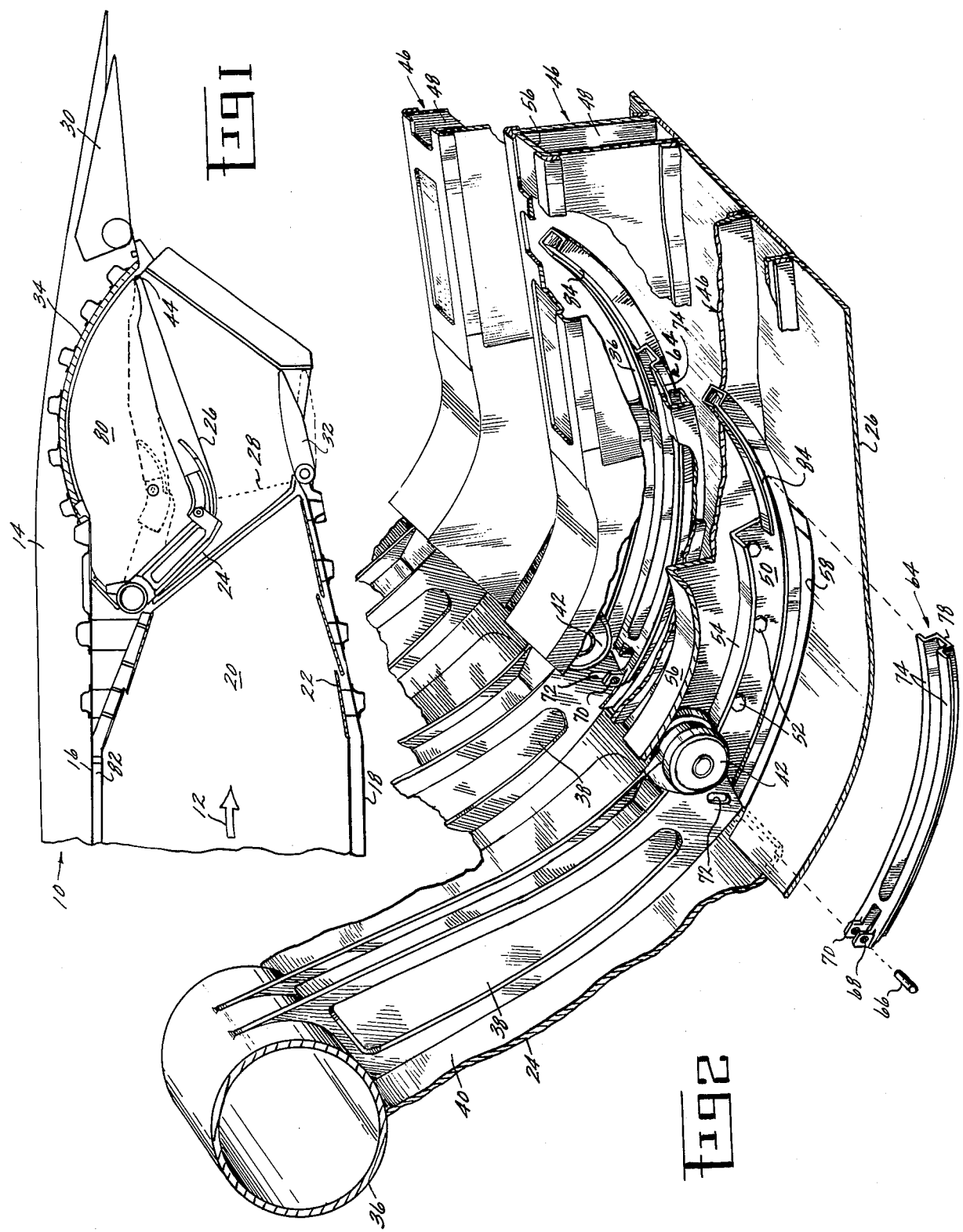

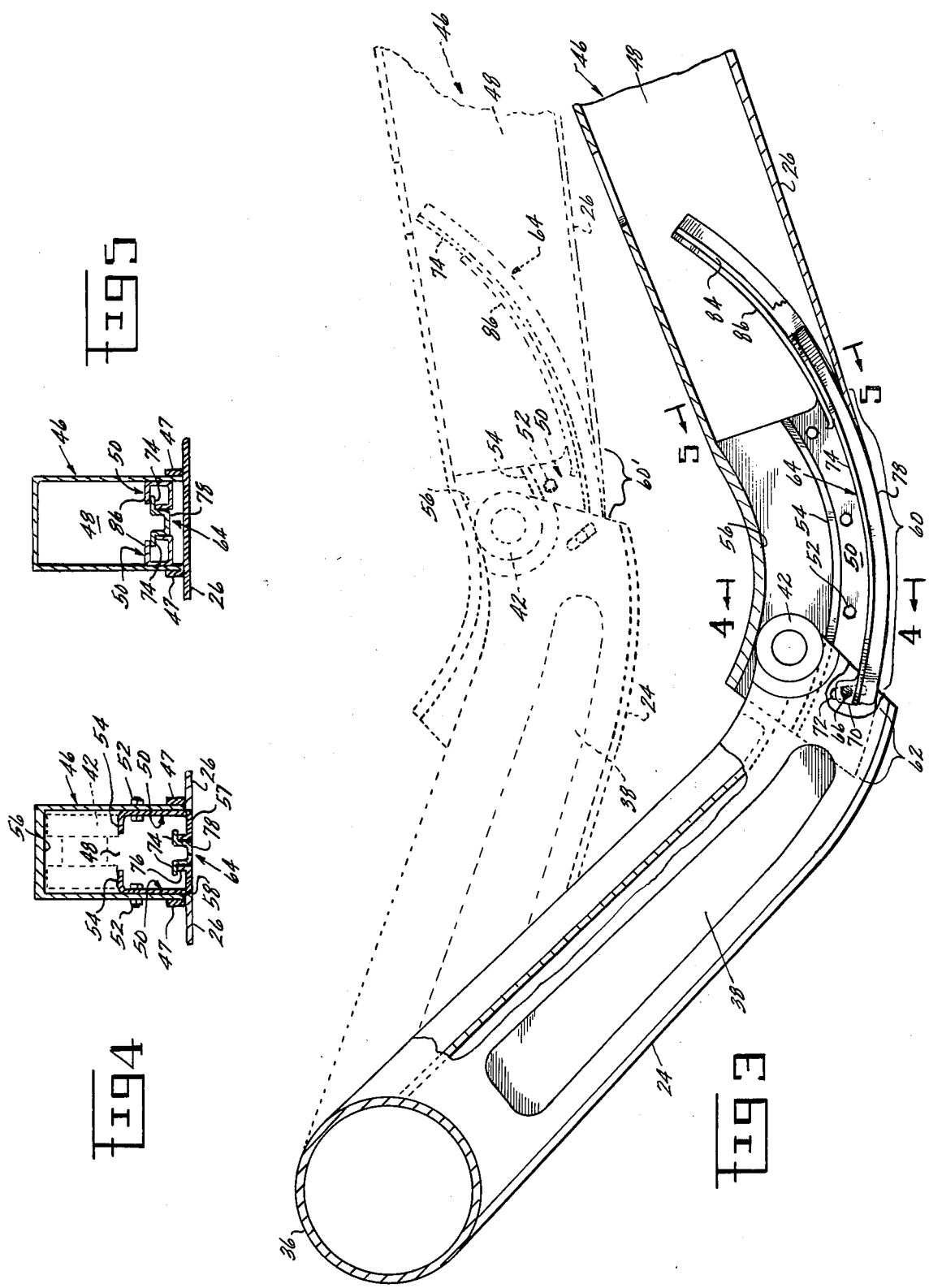

GAS TURBINE ENGINE NOZZLE APPARATUS INCLUDING A NOZZLE FLAP SLOT SEAL

The invention herein described was made in the course of or under a contract or subcontract thereunder (or grant) with the Department of the Navy.

BACKGROUND OF THE INVENTION

This invention relates to variable area jet nozzles such as are used, for example, as the exhaust outlets of gas turbine engines. More particularly, this invention relates to apparatus for sealing between areamodulating nozzle flaps to minimize flow leakage.

Gas turbine engines employ exhaust nozzles to direct the hot gases of combustion rearward into the atmosphere at a velocity and a density necessary to produce the required thrust. Essentially, the energy of the gases in the form of heat and pressure is converted into thrust. The area of the exhaust nozzle is extremely important since it is a determining factor of the efficiency with which thrust is produced. The choice of nozzle area is determined, in part, by turbine inlet temperature, mass airflow rate, and the velocity and pressure of the exhaust gases.

For engines with narrow operating ranges, the nozzle size is optimized during manufacturing and remains constant throughout its operation. Little is to be gained in performance of such an engine by use of variable area nozzles, and any possible benefits are generally outweighed by problems of weight, cost and complexity. On the other hand, it is well known that in advanced engines with broad operating ranges, noise thrust and fuel economy benefits may be achieved by use of variable area nozzles.

Traditionally, variable area nozzles have been adapted to engines having some sort of thrust augmentation, such as afterburner or preturbine injection. By increasing the nozzle area, the potentially higher temperatures associated with augmentation can be maintained at tolerable levels. Typically, a variable area nozzle is opened during low altitude take-off and, at the appropriate altitude after take-off, the nozzle is closed in order to achieve the necessary cruise thrust.

For supersonic flight a convergent-divergent nozzle is required, and such a nozzle must be of the variable area variety if the operating envelope of the engine is very large. Such a nozzle has a convergent portion designed to keep the exhaust gases subsonic until they reach the throat (point of minimum area) at which time they reach sonic velocity. The divergent portion then allows controlled expansion of the gases to supersonic velocities. Most modern variable area exhaust nozzles of the convergent-divergent variety make use of a plurality of pivotable flaps and any required area modulation is accomplished by actuation of these flaps into and out of the exhaust stream. Convergent flaps are used upstream of the throat and divergent flaps are employed downstream thereof.

Two basic means have been employed for connecting the convergent and divergent flaps at the throat. In one type, the flaps are connected at the throat by means of a hinge, with the downstream end of the divergent flap free to move in an axial, as well as radial, direction. However, some of the advanced two-dimensional nozzles, such as that taught and claimed in copending U.S. patent application Ser. No. 572,340 -Nash et al now U.S. Pat. No. 4,000,610 which is assigned the same assignee as the present invention and the disclosure of which is incorporated herein by reference, because of their construction, require that the downstream end of the divergent flap be pivoted at a fixed point. With both the forward and aft flap pivots fixed against axial translation, it becomes necessary to provide for sliding motion at the throat to accomplish throat area modulation. This sliding motion at the throat has been a continual problem in nozzle construction since there is inherent interference between the structural ribs on one flap and the surface of the other.

When nozzle flap motion has been small, this interference has been eliminated by undercutting the structural ribs to clear the flap skin or by employing slots in the skin to clear the ribs, or by a combination of both. However, where large flap motions are required, as in the case of the aforementioned advanced two-dimensional nozzles, or in axisymmetrical nozzles requiring a large area variation range, these are not practical solutions. Large flap motion would require structurally impractical undercutting of the flap structure and/or extensive slots in the flap skin with attendant leakage and performance problems. It is particularly important in such advanced nozzles that propulsion gas leakage between the flaps at the throat be minimized since such leakage leads to nozzle inefficiency. Furthermore, nozzle coolant gas leakage into the flow path may result from gaps between the flaps when the nozzle is of the air-cooled variety, thus increasing coolant flow requirements and penalizing engine cycle performance.

SUMMARY OF THE INVENTION

Accordingly, it is the primary object of the present invention to provide a seal for a gas turbine engine variable area nozzle wherein leakage between overlapping, sliding flaps is minimized without jeopardizing the structural integrity of the flaps or of their actuating mechanisms.

Other objects and advantages will be more clearly understood from the following detailed description, drawings and specific examples, all of which are intended to be typical of rather than in any way limiting on the scope of the present invention.

Briefly stated, the above objective is accomplished in a variable area nozzle wherein axially overlapping flaps define a fluid flow path and wherein the overlapped flap is slotted in the axial direction to receive a structural portion of the overlapping flap. An arcuate seal carried by the overlapping flap is received within the slot and is so contoured as to further define the nozzle flow path. A pair of seats mounted along the sides of the slot slidingly receive a pair of shoulders laterally extending from the seal, and a sleeve supports and captures the seal shoulders during their axial travel. A floating connection between the seal and the overlapping flap provides for positive seating between the seal and its seat.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 is a cross-sectional view of an advanced gas turbine engine variable area nozzle which could incorporate the subject invention;

FIG. 2 is an enlarged, exploded, isometric view of a portion of the nozzle of FIG. 1 depicting the subject invention in greater detail;

FIG. 3 is a further enlarged cross-sectional view of a portion of the nozzle of FIG. 1 showing the subject invention in two operative positions;

FIG. 4 is a cross-sectional view taken along line 4—4 of FIG. 3; and

FIG. 5 is a cross-sectional view similar to FIG. 4 taken along line 5—5 of FIG. 3.

DESCRIPTION OF THE PREFERRED EMBODIMENT

Referring to the drawings wherein like numerals correspond to like elements throughout, attention is first directed to FIG. 1 wherein a gas turbine engine exhaust nozzle, depicted generally at 10, and capable of embodying the present invention, is diagrammatically shown. Hot gases of combustion are expanded through a turbine (not shown) in a manner well known in the art and enter the exhaust nozzle from the left as shown by vector 12. After passing through the nozzle, the flow is vectored in a manner described in detail in the previously referenced copending U.S. patent application Ser. No. 572,340 now U.S. Pat. No. 4,000,610.

Briefly, the nozzle is of the external expansion type with internal nozzle area variation, the nozzle being readily conformable to an aircraft wing 14, for example, to provide a nonredundant, aerodynamically streamlined propulsion package. The nozzle includes two substantially opposed walls 16 and 18 partially defining an exhaust stream flow path 20. A thermal liner 22 supported from the opposing walls protects the walls from the intense heat of the combustion gases. Wall 16 is further defined by a pair of articulated flaps 24, 26 of the convergent and divergent variety, respectively, cooperating to form a nozzle throat 28. The exhaust stream flow path area is thus controlled, in part, by the position of the flaps which can be modulated between the solid and phantom line positions of FIG. 1.

The nozzle is also provided with a wing flap 30 downstream of divergent flap 26 to provide for exhaust deflection (vectoring) and expansion control. Variable ventral flap 32 forming the downstream extremity of wall 18 cooperates with flaps 24 and 26 to further control the flow path throat area and to provide additional expansion control. A rotating bonnet-type deflector 34 is used in the vertical or short take-off and landing operation (V/STOL) modes to deflect the exhaust stream downward, thereby generating propulsive lift. The nozzle is generally of the two-dimensional variety, meaning that its profile is substantially constant in a direction normal to the plane of FIG. 1.

Referring now to FIGS. 2 - 4, the interrelationship of flaps 24 and 26 is depicted in greater detail. Flap 24, herein the convergent flap, is connected at its upstream end to a torque tube 36, the pivoting of which positions the downstream end of the flap vertically into the exhaust stream to modulate the flow path area. An actuation system capable of providing such motion to the torque tube is described in detail in U.S. Pat. No. 3,979,067, which is also assigned to the assignee of the present invention and the disclosure of which is incorporated herein by reference. A plurality of upstanding ribs 38 connected to torque tube 36 and comprising a portion of flap 24 provide rigidity to the flap. The downstream end of each rib has connected thereto a roller 42 which comprises a portion of the connecting apparatus between the convergent and divergent flaps as will be more fully described hereinafter.

Flap 26, the divergent flap, is hinge connected at its downstream end to wall 16 at 44 (FIG. 1). As is most clearly shown in FIG. 2, flaps 24 and 26 slidingly overlap in the axial direction, with flap 24 overlapping flap 26 in the embodiment depicted. Note that both flaps are provided with arcuate portions in the region of overlap to eliminate vertical mismatch during flap actuation and to improve nozzle performance by providing a smooth flow path contour. Both arcuate portions are generally circular in profile and tangent to the otherwise straight flaps. In order to accommodate ribs 38, a plurality of elongated axial slots 58 is formed in the upstream end of flap 26, the number of slots equaling the number of ribs and rollers 42.

A plurality of axially extending U-shaped channels 46 are associated with the back side of flap 26 and are attached thereto as by welding at flanges 47. These channels provide structural rigidity to flap 26 and effectively cover slots 58 to form a plurality of chutes 48 of generally rectangular cross section (FIGS. 4 and 5). Each channel is provided with a pair of mutually opposed guides 50 within the chutes 48, each guide being connected to the channel as by bolted connections 52. Each guide, in turn, includes a camming surface 54 in the form of a laterally extending flange which cooperates with the base 56 of the U-shaped channel to comprise a pair of substantially parallel tracks for receiving one of the rollers 42 associated with flap 24. Each guide also includes an arcuate face portion 57 which partially breaches slot 58, leaving a narrower slot portion therebetween. Thus, the ribs 38 are free to slide within the reduced slot as the rollers engage the tracks. The camming action of the rollers between flange 54 and channel base 56 guarantees simultaneous actuation of both flaps as torque tube 36 is rotated to modulate the flow path area, with flap 26 pivoting about its hinge point 44 and flap 24 overlapping flap 26.

In any position of the flaps, flap 24 will partially overlap slot 58, the amount of overlap being dependent upon the vertical position of the flaps. For example, in the reduced throat area mode represented by the solid line flap positions of FIG. 3, the exposed portion of slot 58 is denominated as 60 and the overlapped portion as 62. As the nozzle throat area is increased to the phantom flap position, the exposed area is reduced as at 60'. However, in almost all flap positions at least a portion of slot 58 is exposed, thus providing a path for leakage of hot exhaust gases or coolant fluids (as will be described later) with attendant losses in propulsive efficiency. Additional losses are generated by the steps in the flow path caused by the presence of the exposed slots.

FIGS. 2 - 5 show a simple nozzle flap slot seal which permits relatively large excursions of the overlapping convergent (24) and divergent (26) flaps without structurally compromising the flaps as by undercutting ribs 38 (or, conversely, cantilevering the arcuate portion of flap 26 in the axial direction beyond the ribs 38 and rollers 42) so as to more completely cover the slots 58. The subject seal not only minimizes leakage through the slots, but also provides a smooth aerodynamic flow path contour for the exhaust gases.

In particular, each rib 38 has associated therewith a seal 64 having a substantially U-shaped cross section and a substantially circular contour in profile, the radius of which is substantially the same as the arcuate upstream portion of flap 26. The seal is attached to each rib 38 by way of a floating connection comprising a pin 66 engaging holes 68 in a pair of tabs 70 formed upon the seal and an elongated hole 72 in the rib, the elongated hole having its major axis in the substantially vertical direction. Each seal is provided with a pair of laterally extending shoulders 74 which slidingly engage a pair of upstanding seats 76, one seat being formed upon each guide 50. Thus, mutually facing sealing surfaces are provided in the form of seats 76 and the adjacent shoulders 74 of the seal. Additionally, the base 78 of the U-shaped seal is so fabricated and contoured that the portion within the slot is flush with the flap 26 and guide portion 57, thereby further defining the aerodynamically smooth flow path 20. Thus, as the nozzle area is varied, the convergent flap 24 causes the seal to slide axially with respect to the divergent flap 26 and seats 76. Since both the seals and seats are circular in contour, sealing is maintained throughout the range of nozzle area modulation. The pin 66 and elongated hole (72) arrangement provides for axial positioning of the seat without restraining it vertically so that each seal is essentially free-floating with respect to its respective seats and the overlapping convergent flap. This is particularly advantageous in a two-dimensional nozzle as shown in FIG. 1. For example, as is more clearly described in copending U.S. patent application Ser. No. 599,644 - Wakeman et al, now U.S. Pat. No. 4,000,612, which is assigned to the assignee of the present invention and the disclosure of which is incorporated herein by reference, a cooling scheme for such a nozzle would utilize the area 80 behind flaps 24 and 26 (see FIG. 1) as a coolant plenum, the plenum being fed as by bleeding coolant air from the compressor portion of the engine (not shown). Such coolant air is fed through passage 82 between coolant liner 22 and wall 16. In such an arrangement, the coolant pressure in plenum 80 would normally exceed that of the exhaust gases within flow path 20. The seal pin and elongated hole arrangement allows the seal to seat properly under the coolant pressure forces for effective leakage control even when slight mismatches in geometry occur.

When the nozzle is open (phantom position of FIGS. 1 and 3) the seal is supported by a seal guide sleeve 84 on the downstream end of guide 50. The guide sleeve includes a second flange 86 formed upon each guide in closer proximity to the seats 76 than cams 54 and generally parallel therewith. These sleeves, associated with the divergent flap, support the seals during their axial travel and retain the seal shoulders 74 between flanges 86 and seats 76 under conditions of low coolant plenum pressure (FIG. 5).

It will become obvious to one skilled in the art that certain changes can be made to the above-described invention without departing from the broad inventive concepts thereof. For example, a simple link could be devised to provide the degree of freedom now provided by the seal pin and slot. Furthermore, the embodiment as depicted shows the divergent flap 26 and the seal 64 positioned by the convergent flap 24. It may be advantageous in some cases to reverse the arrangement by placing the slot 58 in the convergent flap 24 and attaching the seal to the divergent flap 26. The action would be the same in either case. Additionally, the embodiments depicted herein incorporate an arcuate seal and seat. However, it is contemplated that some nozzles may utilize overlapping straight flaps, in which event the seals and seats would not necessarily be arcuate. Also, the disclosure herein has been directed toward asymmetric nozzles, particularly the two-dimensional variety. However, the invention is equally applicable to axisymmetric nozzles such as annular plug nozzles. It is intended that the appended claims cover these and all other variations in the present invention's broader inventive concepts.

Having thus described the invention, what is claimed as novel and desired to be secured by Letters Patent of the United States is:

1. In a variable geometry jet nozzle including a pair of articulated flaps arranged in overlapping sliding axial relationship to partially define a fluid flow path and wherein the overlapped flap includes an axially extending slot partially covered by and receiving a portion of the overlapping flap, the improvement comprising seat means associated with the overlapped flap and mounted substantially parallel to the slot, seal means mounted on the overlapping flap for carriage therewith in the substantially axial direction, and connecting means for permitting said seal to float in the vertical direction with respect to the overlapping flap to provide positive seating between the seal means and seat means, and wherein the seal means is slidingly received within the uncovered portion of the slot and is so contoured as to further define the flow path and minimize leakage therethrough.

2. The invention as recited in claim 1 further comprising sleeve means connected to the overlapped flap for capturing and supporting the seal means during its axial travel, and wherein said seal means, said seat means and said sleeve means are of generally arcuate profile shape.

3. The invention as recited in claim 2 wherein said seal means is provided with a pair of laterally extending shoulders which are slideable along said seat means and which are captured by said sleeve means at the limit of the axial travel of the seal means.

4. The invention as recited in claim 1 wherein said connecting means comprises a pin connected to said seal and movable therewith, said pin received within a substantially vertically extending elongated hole in the overlapping flap.

5. The invention recited in claim 4 wherein the overlapping flap partially defines a convergent portion of the flow path and includes an axially extending rib partially received within said slot, and wherein said elongated hole is located in said rib.

6. The invention as recited in claim 1 wherein said seal and said seat are of generally arcuate profile shape and said seal is of a substantially U-shaped cross section, the base of the "U" being received within the slot and so shaped as to further define a generally continuous flow path contour.

7. Apparatus for modulating the area of a gas turbine engine nozzle comprising: a pair of articulated flaps arranged in overlapping sliding axial relationship to partially define a fluid flow path, the overlapped flap having an arcuate portion provided with an axial slot extending from the overlapped end, the overlapping flap having an axially extending support rib partially received within said slot, and wherein the slot is partially covered by the overlapping flap;

roller means connected to said rib and positionable thereby;

seal means mounted on the overlapping flap for carriage therewith in the axial direction, said seal means slidingly received within the uncovered portion of the slot and being so contoured as to further define the flow path;

guide means associated with the overlapped flap, said guide means including cam and track means for guiding said roller means along a path substantially parallel to the arcuate portion of the overlapped flap, seat means parallel to the slot and upon which the seal means is permitted to slide, sleeve means for capturing and supporting one end of the seal means when it reaches the limit of its axial travel, and wherein said seal means, said seat means and said sleeve means are generally of arcuate profile shape; and connecting means for permitting said seal means to float in the vertical direction with respect to the overlapping flap to provide positive seating between the seal means and seat means.

8. The invention as recited in claim 7 wherein said guide means includes two mutually facing guides, one on each side of the slot, each guide being connected to the overlapped flap and comprising an integral structure including a camming surface at its upstream end to guide the roller means, sleeve means at its downstream end to capture a shoulder extending laterally from said seal means, and seat means along substantially its entire axial length and upon which said shoulders are permitted to slide.

9. The invention as recited in claim 8 wherein each guide includes an arcuate base portion which partially breaches the slot, the seal being slidingly received between said base portions to substantially fill the remainder of the slot.

10. The invention as recited in claim 7 wherein said means for permitting the seal means to float comprises a pin and hole connection between said seal means and said overlapping flap, the hole receiving the pin being elongated in the substantially vertical direction and formed in the support rib.

* * * * *